(12) United States Patent
Totsuka

(10) Patent No.: US 6,443,842 B1
(45) Date of Patent: Sep. 3, 2002

(54) METHOD, PROGRAM PRODUCT, AND GAME SYSTEM FOR BLURRING AN IMAGE

(75) Inventor: Kouichi Totsuka, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/560,346

(22) Filed: Apr. 28, 2000

(30) Foreign Application Priority Data

Jan. 28, 2000 (JP) .......................................... 200-020962

(51) Int. Cl.[7] .................................................. A63F 13/00
(52) U.S. Cl. .......................................... 463/31; 345/418
(58) Field of Search ............................... 463/1, 3, 4, 30, 463/31, 32, 33, 34; 345/418, 419, 422, 426, 427

(56) References Cited

U.S. PATENT DOCUMENTS

| | | | | |
|---|---|---|---|---|
| 5,570,433 A | * | 10/1996 | Nagamine et al. | 382/255 |
| 5,706,417 A | * | 1/1998 | Adelson | 395/129 |
| 5,995,111 A | * | 11/1999 | Morioka et al. | 345/429 |
| 6,034,690 A | * | 3/2000 | Gallery et al. | 345/419 |
| 6,148,113 A | * | 11/2000 | Wolverton et al. | 382/255 |
| 6,157,387 A | * | 12/2000 | Kotani | 345/431 |
| 6,201,517 B1 | * | 3/2001 | Sato | 345/7 |

FOREIGN PATENT DOCUMENTS

| | | |
|---|---|---|
| JP | 6-139353 | 5/1994 |
| JP | 10222694 | 8/1998 |
| JP | 11120377 | 4/1999 |

* cited by examiner

Primary Examiner—Joe H. Cheng
Assistant Examiner—Kim T. Nguyen
(74) Attorney, Agent, or Firm—Greenblum & Bernstein, P.L.C.

(57) ABSTRACT

A method of image display processing for a ball playing game such as a baseball game and a computer readable program product storing a program and video game system for a ball playing game, displaying the screen with an on-the-spot feeling. When converting a three-dimensional image to a two-dimensional image, depth data showing a depth position in a virtual three-dimensional space of the two-dimensional image is obtained and the two-dimensional image at the deeper side from the depth position of the ball of the ball playing game seen in the depth direction of the virtual three-dimensional space is made to become an unfocused image by referring to the depth data and performing blurring processing on the two-dimensional image of the image at the deeper side from the depth position of the ball.

18 Claims, 10 Drawing Sheets

Fig. 4

| SCENE NO. | COMMENT (SCENE EXPLANATION) | 1ST THRESHOLD VALUE Z1 | 2ND THRESHOLD VALUE Z2 | BLURRING VALUE $\alpha x$ |
|---|---|---|---|---|
| 1 | PITCHING AND BATTING SCENE | Za | Zb | $\alpha a$ |
| 2 | FIELDING AND CATCHING SCENE | Zc | Zb | $\alpha b$ |
| ......... | | ......... | ......... | ......... |

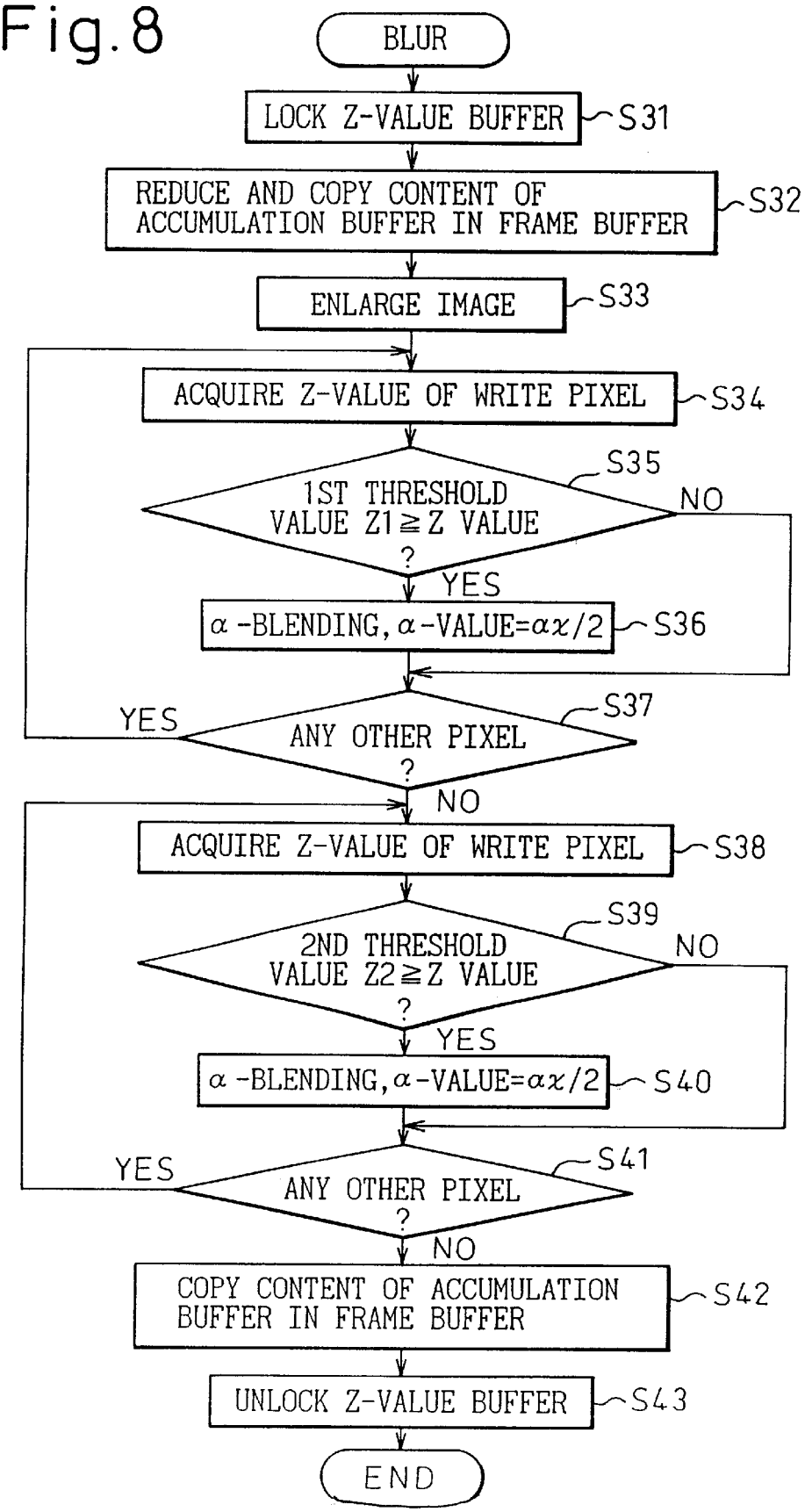

METHOD, PROGRAM PRODUCT, AND GAME SYSTEM FOR BLURRING AN IMAGE

BACKGROUND OF THE INVENTION

1. Field of the Invention

The present invention relates to a method, program product, and game system for blurring an image, more particularly relates to a method of image display processing, computer readable program product, and game system for a ball playing game.

2. Description of the Related Art

In image processing for three-dimensional computer games used by video game systems, processing the image so as to give the image drawn in the virtual three-dimensional space of the monitor screen a blurred effect like that according to the depth of an object etc. and drawing the image in a non-focused state has already been proposed. This type of image processing technique is disclosed in Japanese Unexamined Patent Publication (Kokai) No. 6-139353, Japanese Unexamined Patent Publication (Kokai) No. 10-222694, and Japanese Unexamined Patent Publication (Kokai) No. 11-120377.

Summarizing the problems to be solved by the invention, in the baseball game and other ball playing games of the related art, there was never the idea of displaying a screen having a depth effect of the field as in the field captured by a camera. Therefore, video games never displayed scenes with a distance feel where the stands or other far places become unfocused and with a consequent on-the-spot feeling like the baseball scenes of television broadcasts using television cameras with telescopic lenses.

In baseball game type video games, for example in the pitching and batting scene where a pitcher pitches a ball to a batter, making the image in the range where the ball is located a focused image so as to enable the position of the ball to be well understood, while making the rest of the image an unfocused blurred image gives an on-the-spot feeling and facilitates the progress of the game. The range where the ball is located means the range including for example the pitcher and the batter. Further, the rest of the image other than the range of the ball means for example the outfield, stands, etc.

SUMMARY OF THE INVENTION

An object of the present invention is to provide a method of image display processing for a ball playing game for displaying a scene with an on-the-spot feel and a program product storing a program and video game system for such a ball playing game.

According to a first aspect of the present invention, there is provided a method for blurring an image for execution of a game using a ball in a ball playing field set up in virtual space in accordance with an operation of a player, the method including setting a depth from any perspective point for a ball playing field in the virtual space, judging a position of the ball for the depth set in the ball playing field, changing scenes in accordance with the judged position of the ball, determining a blurring range behind the ball in accordance with the change of scenes, and displaying blurring in accordance with the determined blurring range.

According to a second aspect of the present invention, there is provided a computer readable program product storing a program for execution of a game using a ball in a ball playing field set up in virtual space in accordance with an operation of a player, the program making the computer set a depth from any perspective point for a ball playing field in the virtual space, judge a position of the ball for the depth set in the ball playing field, change scenes in accordance with the judged position of the ball, determine a blurring range behind the ball in accordance with the change of scenes, and display blurring in accordance with the determined blurring range.

According to a third aspect of the present invention, there is provided a game system for playing a game using a ball in a ball playing field set up in virtual space in accordance with an operation of a player, provided with a unit for playing a game in accordance with a program, a memory for storing all or part of the program, and a display screen for displaying a game played by the unit, the unit, in accordance with the program stored in the memory, setting a depth from any perspective point for a ball playing field in the virtual space, judging a position of the ball for the depth set in the ball playing field, changing scenes in accordance with the judged position of the ball, determining a blurring range behind the ball in accordance with the change of scenes, and displaying blurring in accordance with the determined blurring range.

BRIEF DESCRIPTION OF THE DRAWINGS

These and other objects and features of the present invention will become clearer from the following description of the preferred embodiments given with reference to the attached drawings, in which:

FIG. 4. is view explaining the data configuration of an α-value designation table used in a method of image display processing of a ball playing game according to the present invention;

FIG. 8 is a flow chart of the flow of blurring processing in a method of image display processing of an on-the-spot feeling ball playing game according to the present invention;

DESCRIPTION OF THE PREFERRED EMBODIMENTS

Preferred embodiments of the present invention will be explained below with reference to the drawings.

Figure 1:
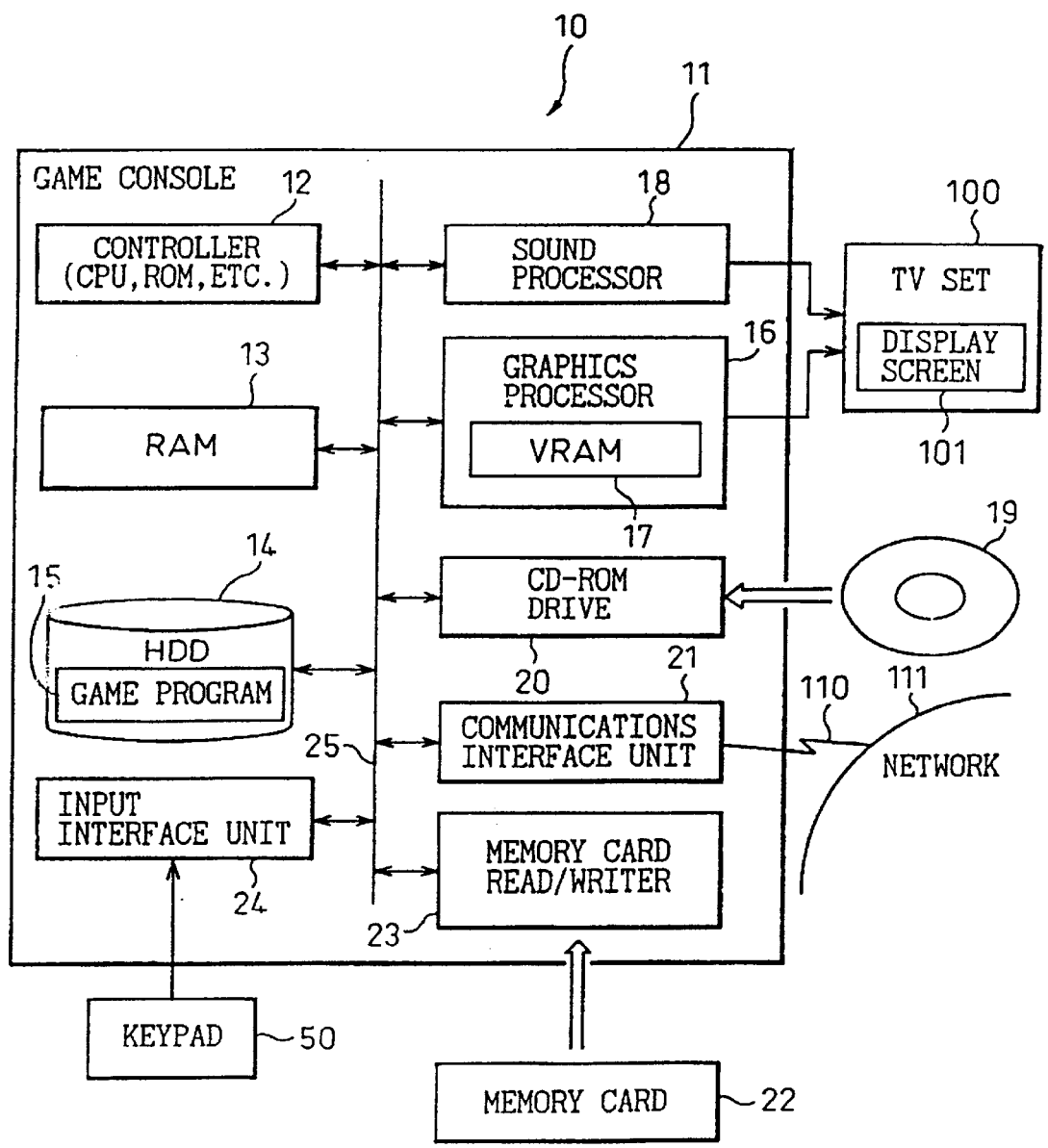
FIG. 1 is a block diagram of a video game system according to an embodiment of the present invention.

FIG. 1 shows a video game system according to an embodiment of the present invention. The video game system executes a program stored in a computer readable program product according to the present invention and is used for working a method of image display processing of a ball playing game according to the present invention.

The video game system 10 is, for example, comprised of a game console 11 and a keypad 50 connected to an input side of the game console 11. A television set 100 having a cathode ray tube (CRT) etc. is connected to an output side of the game console 11 as a monitor with speakers. The keypad 50 is operated by a user (operator) for giving user operating instructions to the game console 11. The television set 100 displays a video (image) and outputs sounds in accordance with the content of the game based on a video signal (image signal) or sound signal from the game console 11.

The game console 11 is for example comprised of a controller 12 including a central processor (CPU), read only memory (ROM), etc., a random access memory (RAM) 13, a hard disk drive 14 able to store a game program on a hard disk (program product) 15, a graphics processor 16 having a video RAM (VRAM) 17, a sound processor 18 generating background music, sound effects, and other sound signals in accordance with commands from the controller 12, a compact disk ROM (CD-ROM) drive 20 for reading a game program, image data, sound data, etc. stored in a program product, a CD-ROM 19, a communications interface unit 21 connected selectively to the network 111 by a communications line 110 for data communications with other devices, a memory read/writer 23 for reading and writing from and to a memory card 22 storing data on the interim progress of the game, data on the game environment settings, and other saved data, an input interface unit 24 for receiving an input signal from a keypad 50, and a bus 25 for connecting these components.

The controller 12 executes the game program stored in the later explained program area 13A of the RAM 13, in this case, a program of a ball playing game, for example, a baseball game. Due to this, the image of the later explained baseball game is displayed.

Figure 2:
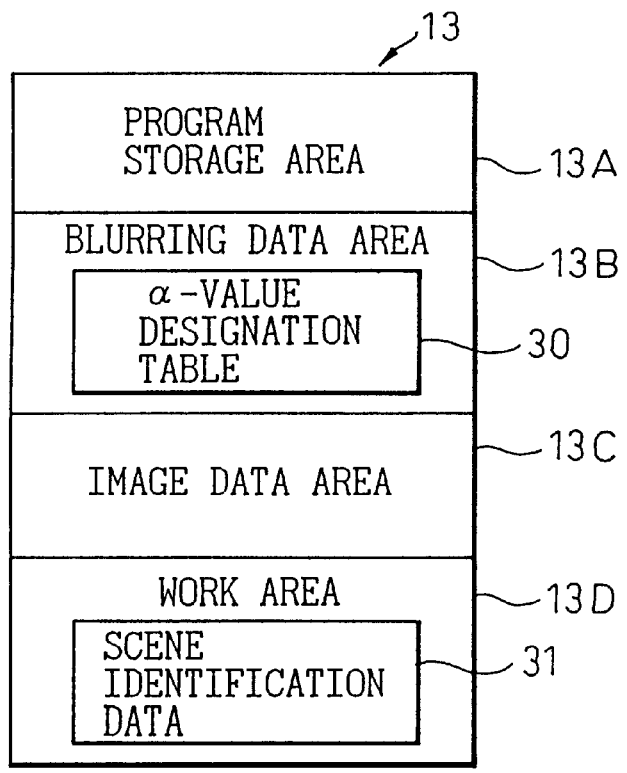
FIG. 2 is a view explaining the internal configuration of a RAM of a video game system according to the present invention.

The RAM 13, as shown in FIG. 2, has defined in it a program area 13A for storing the program of a ball playing game etc., a blurred data area 13B for storing an α-value designation table 30, an image data area 13C for storing the background, game characters, and other image data required in the process of execution of a program, and a work area 13D for storing scene identification data 31 and other various types of data produced in the process of execution of the program and stores the game program and image data read by the CD-ROM drive 20 from the CD-ROM 19 in the areas. Further, the game program or image data may be stored in the hard disk 15 of the hard disk drive 14.

Figure 3:
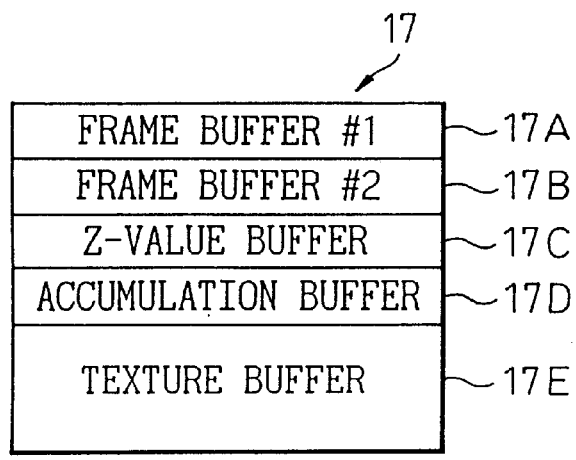
FIG. 3 is a view explaining the internal configuration of a VRAM of a video game system according to the present invention.

The VRAM 17 of the graphics processor 16, as shown in FIG. 3, has defined in it two (#1 and #2) frame buffers 17A and 17B for storing pixel data for display on a screen, a Z-value buffer 17C for storing a Z-value showing a position in a depth direction in the virtual three-dimensional space for each pixel in the frame buffers 17A and 17B, an accumulation buffer 17D used for the blurring processing, and a texture buffer 17E for storing texture data required for polygon display. Note that the Z-value is larger closer up and smaller further away in the virtual three-dimensional space.

The graphics processor 16 generates a video signal based on the image data stored in the frame buffer 17A or 17B based on commands from the controller 12 along with execution of the program and outputs the video signal to the television set 100. Due to this, an image is displayed based on the image data stored in the frame buffer 17A or 17B on the display screen 101 of the television set 100.

The computer readable program product according to the present invention is a computer readable program product storing a baseball game or other game program. The program product is for example comprised of a CD-ROM 19 or hard disk 15. By executing the program stored in the program product in a computer, the computer converts a three-dimensional image to a two-dimensional image, acquires depth data showing the depth position in the virtual three-dimensional space of the two-dimensional image, that is, the Z-value, and makes the two-dimensional image at the deeper side from the depth position of the ball in the ball playing game seen from the depth direction of the virtual three-dimensional space become an unfocused image by referring to the depth data and performing blurring processing on the two-dimensional image of the image at the deeper side from the depth position of the ball.

The blurring processing can reduce and enlarge a two-dimensional image and perform bilinear filtering at the time of reduction and enlargement to obtain a blurred image and combine the blurred image with the original two-dimensional image by a predetermined semitransparency rate.

In a baseball game, the area in the depth direction of the virtual three-dimensional space for the above blurring processing and the semitransparency rate of the same are set individually in the α-value designation table as shown in FIG. 4 for each pitching and batting scene, fielding and catching scene, and other predetermined scenes. In this embodiment, to set a blurred area in two stages, there are a first threshold value Z1 and a second threshold value Z2 as threshold values determining the area in the depth direction of the virtual three-dimensional space on which the blurring processing is to be performed. The semitransparency rate is defined as a blurring value x. The area from the first threshold value Z1 to second threshold value Z2 is blurred just once, while the area deeper than (further from) the second threshold value Z2 is blurred twice for a more blurred image.

For example, in the pitching and batting scene, the first threshold value is set behind the pitcher's mound. Further, in the infield grounder fielding and catching scene, the first threshold value is set behind the range of movement of the infielders.

Figure 5:
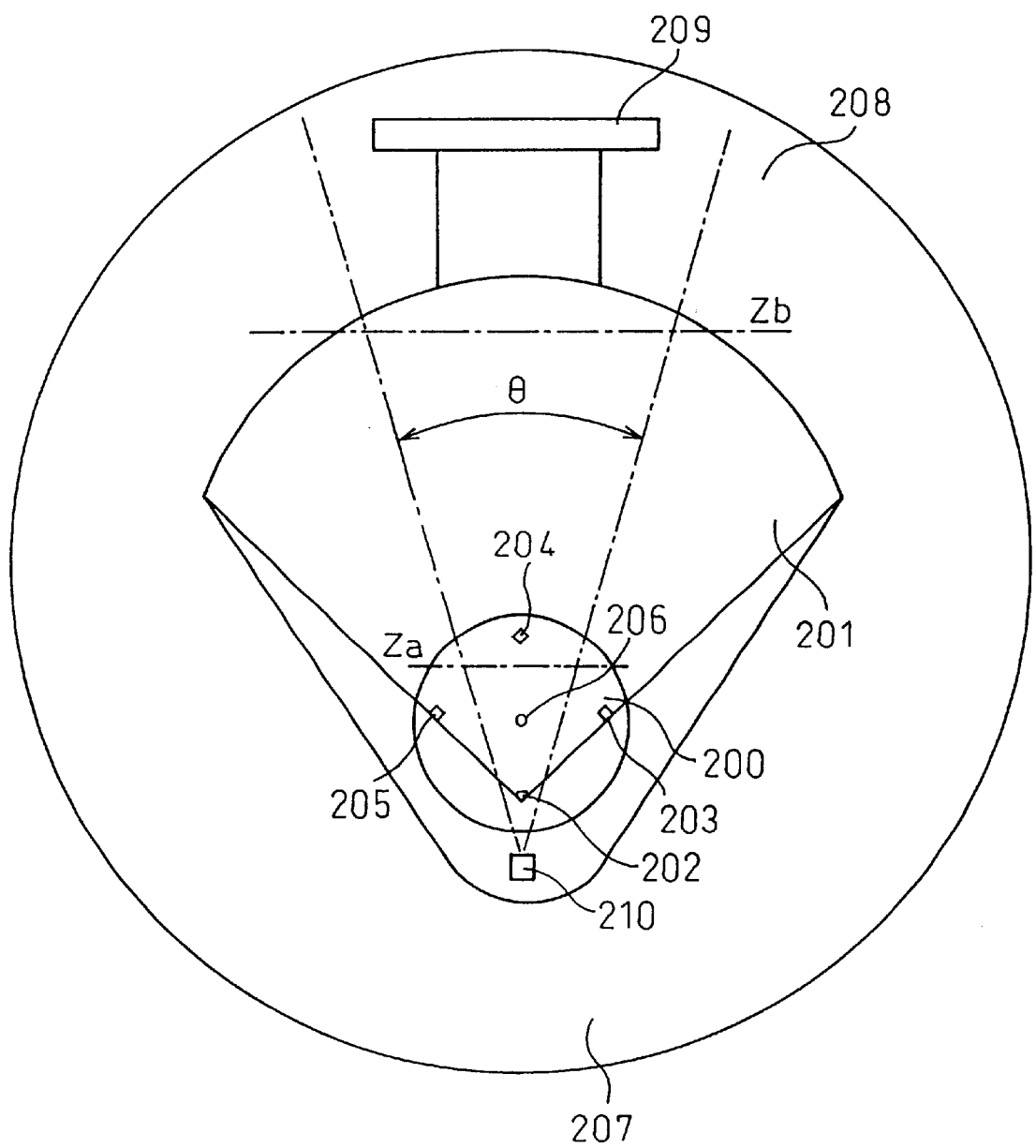
FIG. 5 is a view of a baseball field from the air.

FIG. 5 shows an example of settings of the first threshold value Z1 and second threshold value Z2 in the pitching and batting scene. FIG. 5 is a view of a baseball field from the air. Reference numeral 200 shows the infield area, 201 the outfield area, 202 home base, 203 first base, 204 second base, 205 third base, 206 the pitcher's mound, 207 the infield stands, 208 the outfield stands, 209 the back screen, 210 a virtual video camera, and the angle of the video camera. In the pitching and batting scene, the image of the range of the ball including the pitcher and batter is made a focused image by setting the first threshold value Z1 to behind the pitcher's mound 206 as Za and setting the second threshold value Z2 to behind the outfield as Zb.

Next, an explanation will be made of the operation of a video game system 10 according to the above configuration with reference to the flowchart shown in FIG. 6, FIG. 7, and FIG. 8. Note that the processing after this is performed by the controller 12 of the game console 11 executing the game program.

Figure 6:
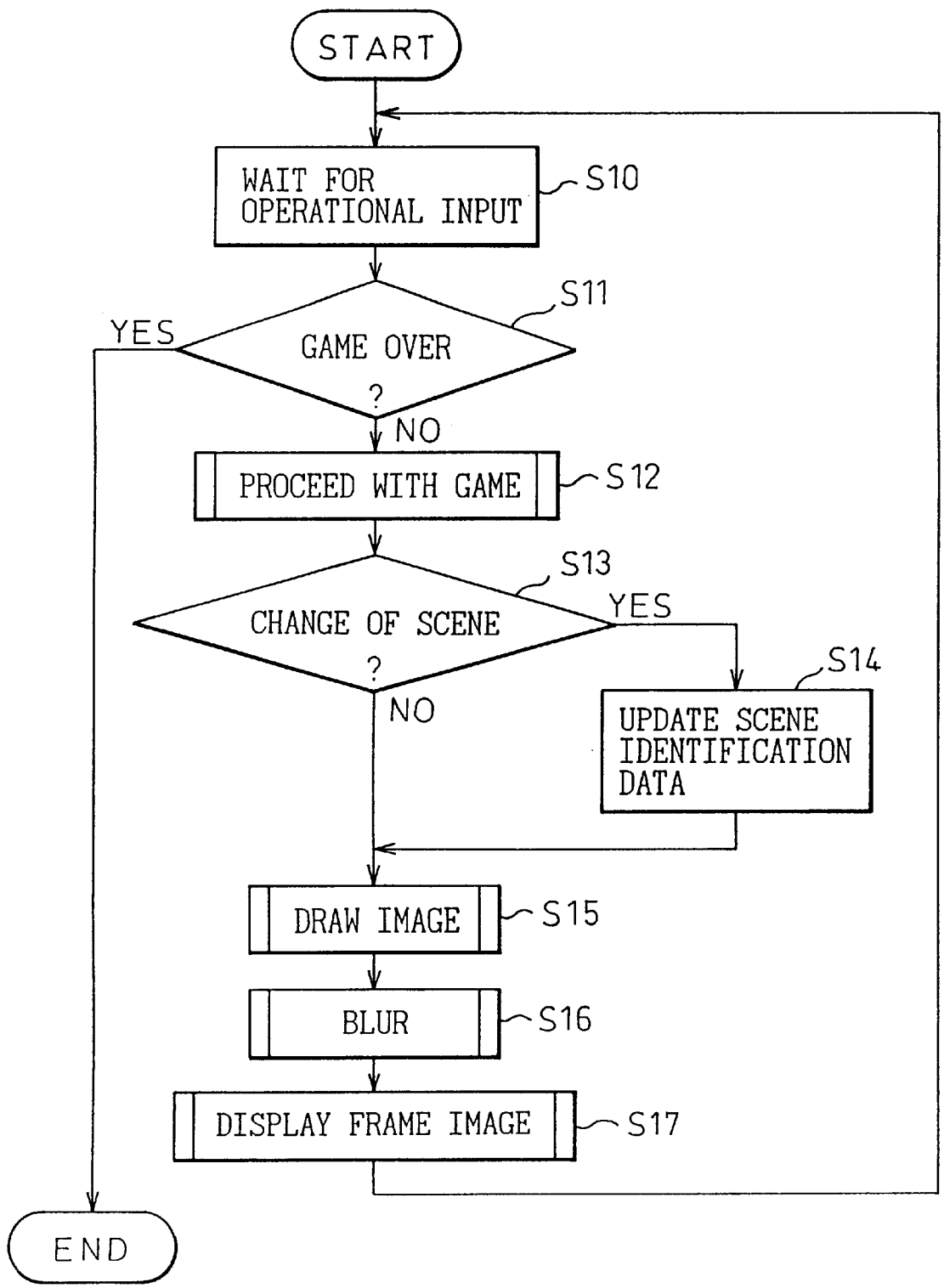
FIG. 6 is a flow chart of the general flow of execution of a game program of a video game system according to the present invention.

FIG. 6 shows the flow of processing of the game as a whole. The controller 12 waits for the operational input from the keypad 50 (step S10). If the input is for ending the game (YES at step S11), the controller 12 ends the processing. If the input is other than one for ending the game (NO at step S11), the controller 12 performs the predetermined processing for progress of the game in accordance with the game program in response to operational input (step S12). Next, it determines if the scene should be changed along with the progress of the game (step S13). For example, when the position of the perspective point changes, the scene is changed. If the scene is changed, the controller 12 updates the scene identification data of the work area 13D (step S14). Switching of a scene means for example when a ball hit by the batter flies beyond the pitcher. In this case, the scene is switched from the pitching and batting scene to the infield grounder fielding and catching scene. Note that the scene may also be changed right after the batter hits the ball.

Further, when the ball rolls to the outfield in a scene focused on an infielder (for example, the infield grounder fielding and catching scene), the scene can be changed to focus on an outfielder.

The controller 12 next performs the image drawing processing (step S15), the blurring processing (step S16), and the frame image displaying processing (step S17). Subsequently, the logic returns to step S10 to await input.

Figure 7:
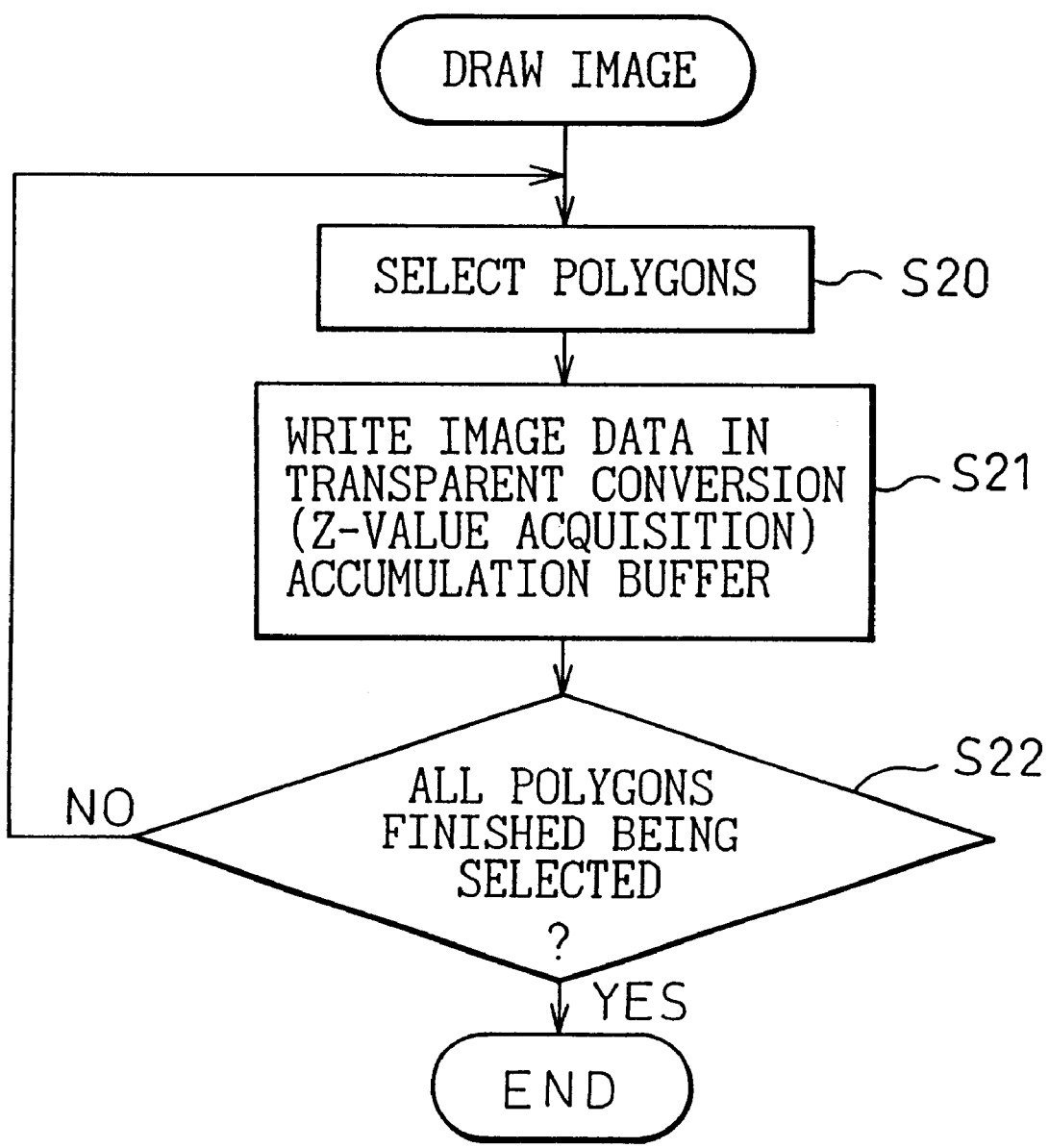
FIG. 7 is a flow chart of the flow of image drawing processing in a method of image display processing of an on-the-spot feeling ball playing game according to the present invention.

FIG. 7 shows the flow of the image drawing processing. In image drawing processing, the controller 12 selects one polygon at a time (step S20). It makes the selected polygon transparent, converts the three-dimensional image to a two-dimensional image, and writes the image data in the accumulation buffer 17D. At that time, it acquires depth data showing the depth position in the virtual three-dimensional space of the two-dimensional image, that is, the Z-value, and writes this in the Z-value buffer 17C (step S21). The controller 12 then repeats the above processing until all of the polygons have finished being selected (step S22).

FIG. 8 shows the flow of the blurring processing. In the blurring processing, the controller 12 locks the Z-value buffer 17C to prohibit overwriting (step S31). It reduces and copies the content of the accumulation buffer 17D in the frame buffer 17A or 17B with bilinear filtering (step S32). Next, it performs processing for enlarging the image to its original size with bilinear filtering (step S33). Due to this, a blurred image is obtained.

Next, the controller 12 obtains the Z-value of the write pixel from the Z-value buffer 17C (step S34). It determines if the Z-value is smaller than the first threshold value Z1 (step S35). If the Z-value is smaller than the first threshold value Z1, the pixel is one in the first blurring area, so the pixel is α-blended with a semitransparency α-value of a ×/2 (step S36). If the Z-value is not smaller than the first threshold value, blending is not performed. The above processing is successively performed for all pixels (step S37).

Figure 9A:
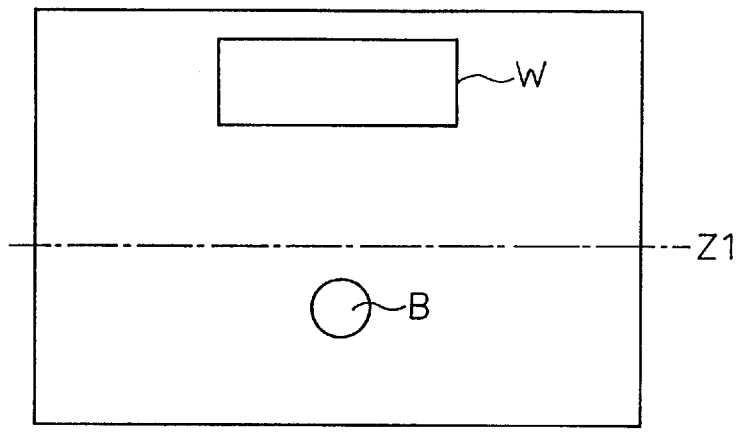
FIG. 9A is a first view schematically showing an outline of blurring processing in a method of image display processing of an on-the-spot feeling ball playing game according to the present invention.
Figure 9B:
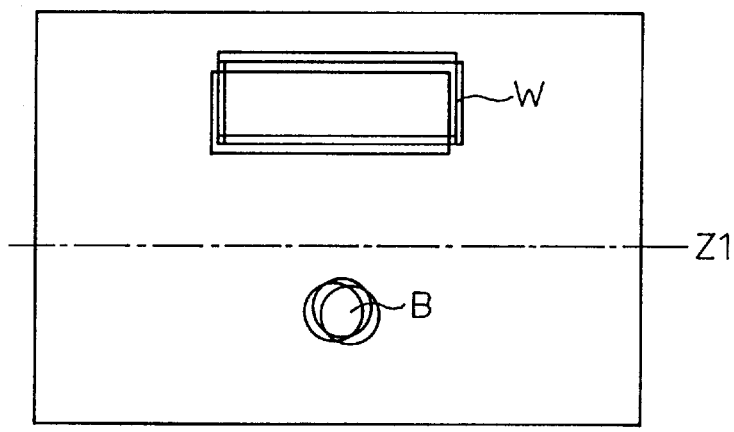
FIG. 9B is a second view schematically showing an outline of blurring processing in a method of image display processing of an on-the-spot feeling ball playing game according to the present invention.
Figure 9C:
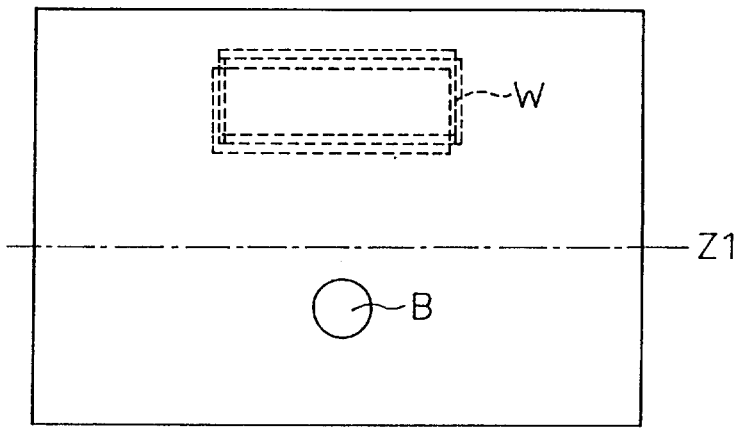
FIG. 9C is a third view schematically showing an outline of blurring processing in a method of image display processing of an on-the-spot feeling ball playing game according to the present invention.

FIG. 9A schematically shows the original image, FIG. 9B the image after the blurring processing by reduction and enlargement, and FIG. 9C the image after α-blending. In these figures, B shows the ball, while W shows the stands and rest of the background part. The ball B is in front of the first threshold value Z1, while the stands and rest of the background part W is deeper than the first threshold value Z1. Therefore, in the image after α-blending, the ball B is not combined with a blurred image, while the background part W is combined with a blurred image. Due to this, the background part W becomes an unfocused blurred image.

When the first blurring processing ends, the controller 12 again acquires the Z-value of the write pixel from the Z-value buffer 17C (step S38) and determines if the Z-value is smaller than the second threshold value Z2 (step S39). If the Z-value is smaller than the second threshold value Z2, the pixel is in the second blurring area, so is α-blended with a semitransparency α-value of a ×/2 (step S40). If the Z-value is not smaller than the second threshold value Z2, α-blending is not performed. The above processing is successively performed for all pixels (step S41). Due to this, the image of the second blurred area becomes a further blurred image.

When the second blurring processing ends, the controller 12 copies the content of the accumulation buffer 17D in the frame buffer 17A or 17B (step S42). Next, it unlocks the Z-value buffer 17C (step S43). Finally, the processing ends.

Figure 10:
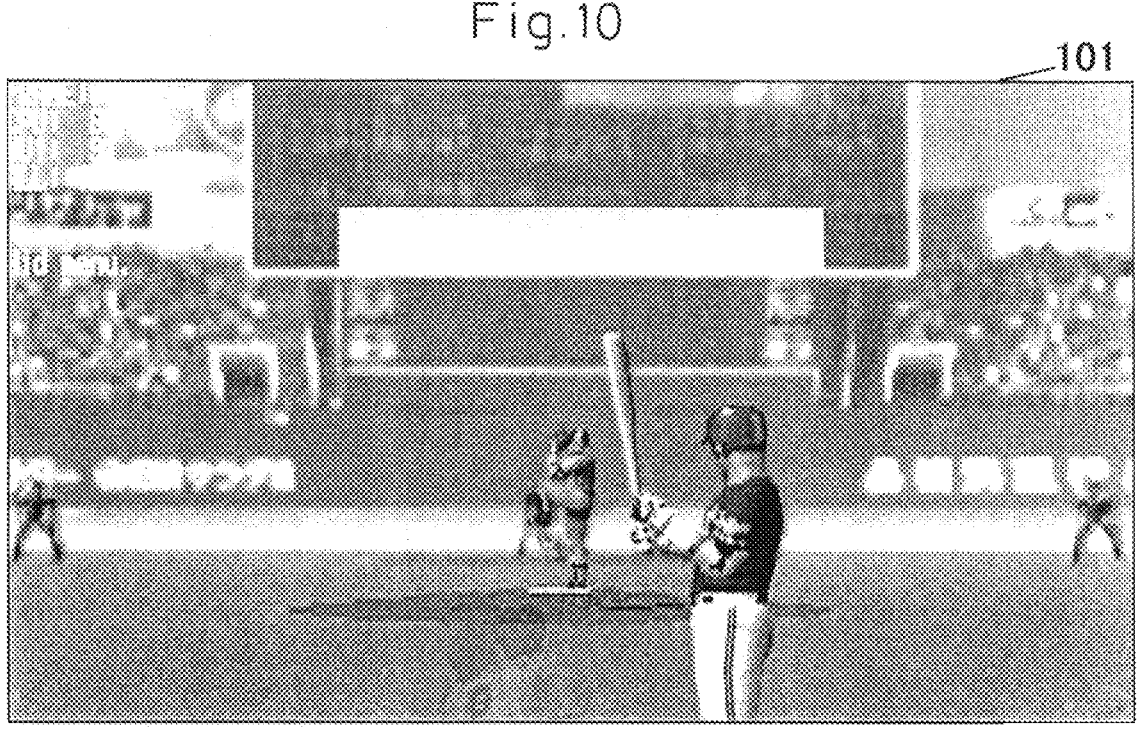
FIG. 10 is a view explaining an example of image display in a method of image display processing of an on-the-spot feeling ball playing game according to the present invention.

Due to the above processing, as shown in FIG. 10, in the pitching and batting scene, the image of the range of the ball, including the pitcher and batter, becomes a focused image, while the image behind it becomes an unfocused image.

Figure 11A:
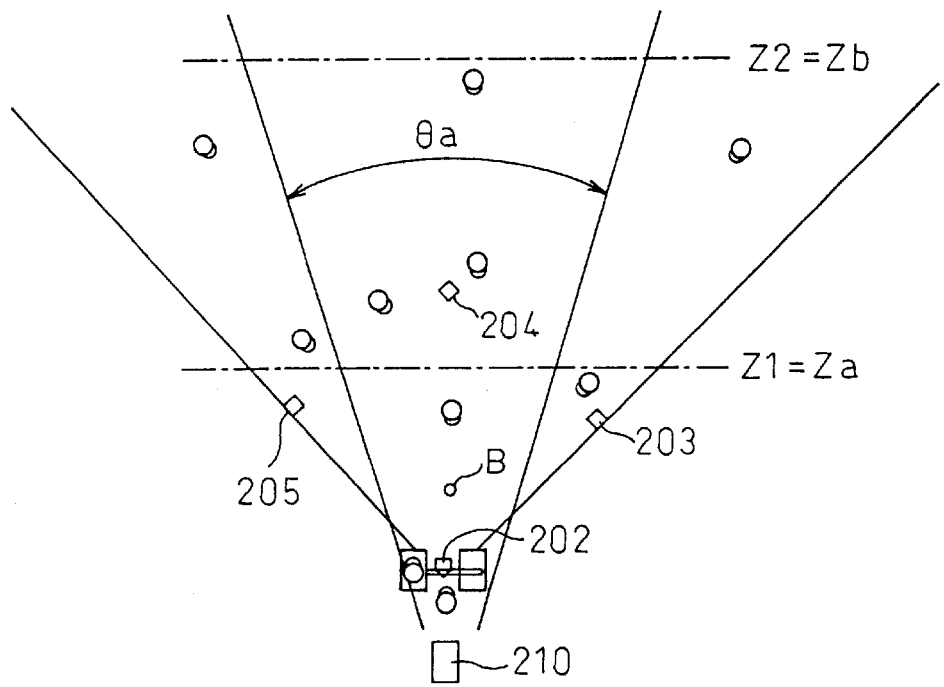
FIG. 11A is a first view of another embodiment of a method of image display processing of an on-the-spot feeling ball playing game according to the present invention.
Figure 11B:
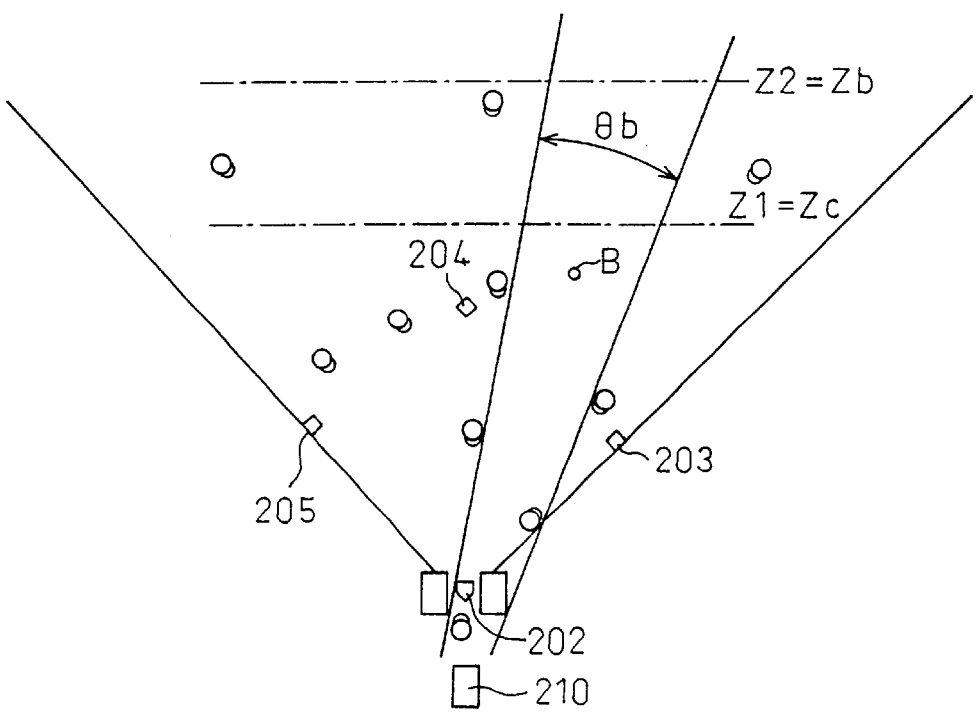
FIG. 11B is a second view of another embodiment of a method of image display processing of an on-the-spot feeling ball playing game according to the present invention.

In the above embodiment, the first threshold value Z1 and second threshold value Z2 are set fixed for every scene, but as shown in FIG. 11A and FIG. 11B, it is also possible to change the first threshold value Z1 and second threshold value Z2 in accordance with the depth position in the virtual three-dimensional space of the ball B and variably set the area in the depth position of the virtual three-dimensional space for the blurring processing in accordance with the depth position in the virtual three-dimensional space of the ball B.

FIG. 11A shows the pitching and batting scene, while FIG. 11B shows the fielding and catching scene. In the fielding and catching scene, the ball is behind the line between first and second bases, so the first threshold value Z1 changes to Zc behind Za in the pitching and batting scene. At that time, a predetermined amount of offset is given to the position of the ball and the first threshold value Z1 is reduced. Due to this, even if the depth of the ball B, the target object in focusing, in the virtual three-dimensional space changes, there is no sudden blurring. In this way, in the fielding and catching scene, the first threshold value may be made deeper than the position of the ball by exactly a predetermined amount by changing the first threshold value for each display frame.

Note that the processing for making the rear of the position of the ball a blurring range may be applied to a scene focusing on an outfielder.

In the case of the above processing, the angle of the image is controlled in accordance with the distance from the perspective position (camera position) to the target object. That is, the longer the distance from the perspective position to the target object, the smaller the image angle such as $\theta a \geq \theta b$. This being so, when the target object becomes further than the perspective point, the target object is zoomed in on in a focused state of the target object. Since the target object is further than the perspective point, even if zoomed in on, the size of the target object of the screen display does not change. Further, in the fielding and catching scene, the perspective position can be made to move to follow the target object. In this case, a predetermined distance is held for the distance between the perspective position and target object. Due to this, in the fielding and catching scene, even if the first threshold value is fixed to a predetermined value, a position deeper than the position of the ball by exactly a predetermined amount becomes the first threshold value at all times.

The present invention is not limited to application to a baseball game and may be applied to a soccer game, tennis game, golf, or other ball playing game as well.

Note that the method of image display processing of a ball playing game explained in the above embodiment may be realized by execution of a prepared program by a personal computer, video game system, etc. The program for image display processing of a ball playing game is stored in a hard disk, floppy disk, CD-ROM, magneto-optic disk (MO), digital versatile disk (DVD), or other computer readable program product and executed by being read from the program product by a computer. Further, the program may be distributed through such a program product or through the Internet or other networks.

Summarizing the effects of the invention, as will be understood from the above explanation, according to the present invention, there is provided a method of image display processing, computer readable program product storing a program, and a game system for a ball playing game which displays an image in a virtual three-dimensional space on a monitor screen which converts a three-dimensional image to a two-dimensional image, acquires depth data showing a depth position in a virtual three-dimensional space of the two-dimensional image, and makes the two-dimensional image at the deeper side from the depth position of the ball of the ball playing game seen in the depth direction of the virtual three-dimensional space become an unfocused image by referring to the depth data and performing blurring processing on the two-dimensional image of the image at the deeper side from the depth position of the ball, thereby displaying a screen with an on-the-spot feeling and as a result facilitating the progress of the game.

While the invention has been described by reference to specific embodiments chosen for purposes of illustration, it should be apparent that numerous modifications could be made thereto by those skilled in the art without departing from the basic concept and scope of the invention.

The present disclosure relates to subject matter contained in priority Japanese Patent Application No. 020962/2000, filed on Jan. 28, 2000 the contents being herein expressly incorporated by reference in its entirety.

I claim:

1. A method for blurring an image for execution of a game using a ball in a ball playing field set up in virtual space in accordance with an operation of a player, the method including:
    setting a depth from any perspective point for a ball playing field in said virtual space,
    judging a position of the ball relative to the depth set in the ball playing, field,
    changing scenes in accordance with the judged position of the ball,
    determining a blurring range behind the ball in accordance with the change of scenes, and
    displaying blurring in accordance with the determined blurring range.

2. The method as set forth in claim 1, wherein said game is baseball and, in a scene focusing on an infielder by predetermined processing or operation by the player, the area behind the range of action of the infielder is determined as the blurring range for that depth.

3. The method as set forth in claim 2, wherein in said scene, the blurring range determined as behind the infielder is fixed.

4. The method as set forth in claim 2, wherein when the position of the ball, determined by one of predetermined processing or operation by the player, is judged to be in the determined blurring range, the current scene is changed to a scene focusing on an outfielder.

5. The method as set forth in claim 1, wherein said game is baseball and, in a scene focusing on an outfielder by predetermined processing or operation by the player, the area behind the judged position of the ball is determined as the blurring range.

6. The method as set forth in claim 5, wherein, in said scene, a predetermined offset is added to the judged position of the ball to determine the blurring range.

7. A computer readable program product storing a program for execution of a game using a ball in a ball playing field set up in virtual space in accordance with an operation of a player,
    the program making the computer:
        set a depth from any perspective point for a ball playing field in said virtual space,
        judge a position of the ball for the depth set in the ball playing field,
        change scenes in accordance with the judged position of the ball,
        determine a blurring range behind the ball in accordance with the change of scenes, and
        display blurring in accordance with the determined blurring range.

8. The program product as set forth in claim 7, wherein said game is baseball and, in a scene focusing on an infielder by predetermined processing or operation by the player, the area behind the range of action of the infielder is determined as the blurring range for that depth.

9. The program product as set forth in claim 8, wherein in said scene, the blurring range determined as behind the infielder is fixed.

10. The program product as set forth in claim 8, wherein when the position of the ball, determined by one of predetermined processing or operation by the player, is judged to be in the determined blurring range, the current scene is switched to a scene focusing on an outfielder.

11. The program product as set forth in claim 7, wherein said game is baseball and, in a scene focusing on an outfielder by predetermined processing or operation by the player, the area behind the judged position of the ball is determined as the blurring range.

12. The program product as set forth in claim 11, wherein, in said scene, a predetermined offset is added to the judged position of the ball to determine the blurring range.

13. A game system for playing a game using a ball in a ball playing field set up in virtual space in accordance with an operation of a player, provided with:
    a unit for playing a game in accordance with a program,
    a memory for storing at least part of the program, and
    a display screen for displaying a game played by the unit,
    the unit,
    in accordance with the program stored in the memory,
        setting a depth from any perspective point for a ball playing field in said virtual space, judging a position of the ball for the depth set in the ball playing field, changing scenes in accordance with the judged position of the ball, determining a blurring range behind the ball in accordance with the change of scenes, and displaying blurring in accordance with the determined blurring range.

14. The game system as set forth in claim 13, wherein said game is baseball and said unit, in a scene focusing on an infielder by predetermined processing or operation by the player, determines the area behind the range of action of the infielder as the blurring range for that depth.

15. The game system as set forth in claim 14, wherein said unit, in said scene, fixes the blurring range determined as behind the infielder.

16. The game system as set forth in claim 14, wherein the unit, when the position of the ball, determined by one of predetermined processing or operation by the player, is judged to be in the determined blurring range, changes the current scene to a scene focusing on an outfielder.

17. The game system as set forth in claim 13, wherein said game is baseball and said unit, in a scene focusing on an outfielder by predetermined processing or operation by the player, determines the area behind the judged position of the ball as the blurring range.

18. The game system as set forth in claim 17, wherein the unit, in said scene, adds a predetermined offset to the judged position of the ball to determine the blurring range.

* * * * *

UNITED STATES PATENT AND TRADEMARK OFFICE
CERTIFICATE OF CORRECTION

PATENT NO.     : 6,443,842 B1
DATED          : September 3, 2002
INVENTOR(S)    : K. Totsuka It is certified that error appears in the above-identified patent and that said Letters Patent is hereby corrected as shown below:

<u>Title page,</u>
Item [30], Foreign Application Priority Data, "200-020962" should be
-- 2000-020962 --.

<u>Column 7,</u>
Line 60, after "playing" delete ",".

Signed and Sealed this

Third Day of June, 2003

JAMES E. ROGAN
*Director of the United States Patent and Trademark Office*